United States Patent [19]
Roberts et al.

[11] Patent Number: 5,438,184
[45] Date of Patent: Aug. 1, 1995

[54] METHOD AND APPARATUS FOR ELECTRONIC CASH TRANSACTIONS

[75] Inventors: Alan B. Roberts, Palo Alto; James S. Arakaki, Loomis, both of Calif.

[73] Assignee: Verifone Inc., Redwood City, Calif.

[21] Appl. No.: 143,573

[22] Filed: Oct. 26, 1993

[51] Int. Cl.⁶ .............................................. G06K 5/00
[52] U.S. Cl. ...................................... 235/380; 902/22
[58] Field of Search ................... 902/22, 26; 235/379, 235/380

[56] References Cited
U.S. PATENT DOCUMENTS

| | | | |
|---|---|---|---|
| 4,722,054 | 1/1988 | Yorozu et al. | 902/22 |
| 4,877,947 | 10/1989 | Mori | 902/26 |
| 5,012,077 | 4/1991 | Takano | 902/22 |
| 5,017,766 | 5/1991 | Tamada et al. | 902/26 |

FOREIGN PATENT DOCUMENTS

4-43493  2/1992  Japan .................... 235/380

Primary Examiner—F. L. Evans
Attorney, Agent, or Firm—Lowell C. Bergstedt

[57] ABSTRACT

A paystation device adapted to be coupled to a transaction terminal for carrying out a transaction between a seller and a buyer using a smart card having a cash token value stored therein and having a current cash token value. A smart card interface accepts insertion of a smart card for reading a current cash token value stored therein and for writing a new cash token value thereto. A display device displays cash amounts. A communication interface communicates data messages between the paystation device and the transaction terminal. A programmed control unit is coupled to and operates the smart card interface, the display device, and the communication interface.

10 Claims, 5 Drawing Sheets

METHOD AND APPARATUS FOR ELECTRONIC CASH TRANSACTIONS

This application is related to a co-pending and commonly assigned application of Nakamura et al, bearing Ser. No. 08/071,283, filed Jun. 2, 1993, and entitled: SYSTEM AND METHOD FOR REVALUATION OF STORED TOKENS IN IC CARDS. The content of this co-pending application is incorporated by reference herein to provide additional background information pertinent to this invention.

BACKGROUND OF THE INVENTION

This invention relates to methods and apparatus for carrying out a cash transaction utilizing an integrated circuit card, also known as a smart card, with a cash token stored in the card.

One of the uses of smart cards that is currently being considered is the electronic purse. This concept involves storing cash token information in the smart card. The cardholder then uses the Electronic Purse to make cash purchases. The Electronic Purse smart card is inserted into a terminal at a transaction station to indicate payment by cash stored on the smart card. The value of the cash purchase is subtracted from the Electronic Purse and added to an electronic cash file of the merchant for later settlement with a bank. The preferred Electronic Purse system permits upward revaluation of the cash token using special terminals and ATM systems. The goal of an Electronic Purse system is to be a substitute for carrying money tokens in the form of government issued paper bills and metal coins- one Electronic Purse smart card in the wallet or purse instead of a wad of paper bills and a pocketful of change.

To achieve acceptance, an Electronic Purse system must be at least as convenient as obtaining, carrying and using paper and metal money, and preferably, more convenient. Several challenges must be met to achieve this level of convenience:

1. System elements must make it easy to add cash value to the Electronic Purse- at least as easy as obtaining paper money from an ATM. Greater than ATM access would promote widespread acceptance of the Electronic Purse.

2. System elements must make it easy for the holder of the Electronic Purse to 'see' the amount of cash stored in the Electronic Purse before starting a purchase activity.

3. System elements must make completing an Electronic Purse transaction at least as easy as using paper and metal money.

Challenge 1

To meet challenge 1, at a minimum, ATMs must have the capability to add cash value to an Electronic Purse. It would also be helpful to have special Electronic Purse revalue stations in major stores and other public locations. The Personal ATM invention in the above-referenced patent application provides the ultimate convenience, enabling a person to add cash value to Electronic Purse from a private location, e.g. home or office. The Personal ATM eliminates a trip to a public ATM location to obtain cash, making an Electronic Purse more convenient than paper-based cash.

Challenge 2

The Personal ATM described in the above-referenced patent application also makes it easy to see the cash value in an Electronic Purse at home or office, but not all holders of an Electronic Purse will have a Personal ATM. Equipment must also be available at stores to permit use of an Electronic Purse to see their stored cash balance well in advance of committing to a purchase.

Challenge 3

People are accustomed to paying for transactions with paper money and coins or by writing a personal check. With the advent of credit cards and point-of-sale transaction terminals with credit verification capabilities, people became accustomed to paying for transactions with a credit card. More recently, debit cards have become more popular and on-line debit transactions with money directly debited from the persons bank account have become increasingly routine. However, these automated transaction methods are perceived as taking longer than using cash and involving more hassle. They are typically used where high purchase value is involved, but have not achieved heavy penetration in low value purchases, especially in high customer volume locations where a quick and easy transaction is desired by the immediate purchaser and persons waiting in line behind them. To encourage people to use an Electronic Purse, the ease of completing a transaction must be equivalent to or better than paying by cash.

Traditional approaches to transaction processing involve many interactive steps between the person and the machine. Thus a traditional approach to carrying out an Electronic Purse transaction would involve these steps:

1. display prompts "Insert Card"
2. holder inserts card
3. system reads card and displays "Card Balance"
4. after the transaction is totaled, display indicates "Purchase Amount" and request confirmation
5. holder presses "Yes" button to proceed
6. new card balance is calculated, stored and displayed
7. display prompts "Remove Card"

This transaction sequence can easily take 10–30 seconds depending on the attentiveness of the card holder and familiarity with the steps involved. This amount of time is not likely to promote use of the Electronic Purse over other competing transaction methods.

It should thus be apparent that acceptance of the Electronic Purse will require more advantageous methods and apparatus for use of the system.

OBJECTS OF THE INVENTION

It is the principal object of this invention to provide an improved method and system for use of an Electronic Purse in carrying out transactions.

It is another object of this invention to provide an intuitive and context sensitive method and apparatus for Electronic Purse transactions.

FEATURES AND ADVANTAGES OF THE INVENTION

One aspect of this invention comprises a method of carrying out a transaction between a buyer and a seller using a smart card having a cash token stored therein with a current cash token value. The method involves disposing on the seller's premises at a location separated from a transaction station a lookstation device having a distinctive Lookstation Symbol associated therewith. The lookstation device is adapted for insertion by a buyer of a smart card, followed by automatic read and display to the buyer of the current cash token value stored therein to inform the buyer of his cash purchasing power. The method also includes disposing on the seller's premises at a transaction station a paystation device having a distinctive Paystation Symbol associated therewith and being coupled to a transaction terminal for participating in carrying out a transaction by means of the following steps:

a. the transaction terminal communicating to the paystation device a cash transaction amount;

b. the paystation device displaying the cash transaction amount;

c. the buyer inserting into the paystation device a smart card having a cash token stored therein to indicate acceptance of the cash transaction;

d. the paystation device reading the current cash token value in the inserted smart card;

e. the paystation device calculating a new cash token value as the difference between the current cash token value and the cash transaction amount;

f. the paystation device automatically writing the new cash token value into the cash token of the smart card without further action by the buyer; and g. the paystation device communicating a cash transaction completion message to the transaction terminal.

The advantage of this transaction method is that both the lookstation device and paystation device carry out their respective activities without any buyer interaction other than inserting the Electronic Purse smart card into the card reader slot of the device. The Lookstation Symbol and the Paystation Symbol advise the buyer what transaction is being carried out by the terminal at that station. The lookstation device gives the holder of an Electronic Purse a quick look at the available cash, satisfying Challenge 2 above.

The tender of the Electronic Purse smart card to the paystation is the buyer's offer to pay using value stored in the card without the buyer having to push any buttons to agree to the amount of the transaction. The transaction is off line because of the background understanding that the Electronic Purse smart card is a bearer token, just like paper money. The lookstation will authenticate the genuineness of the Electronic Purse smart card similar to a clerk visually checking if a tendered bill is counterfeit. The entire transaction can be carried out in two or three seconds or less after the buyer has inserted the Electronic Purse smart card into the paystation device. The Electronic Purse transaction will be faster than use of paper money, especially when the seller's clerk has to make change from the till.

Another aspect of this invention involves a paystation device adapted to be coupled to a transaction terminal for carrying out a transaction between a seller and a buyer using a smart card having a cash token value stored therein and having a current cash token value. The paystation device includes a smart card interface for accepting insertion of a smart card, for reading a current cash token value stored therein, and for writing a new cash token value thereto, a display for displaying cash amounts, a communication interface for communicating data messages between the paystation device and the transaction terminal, and a programmed control device coupled to the smart card interface the display, and the communication interface. The programmed control device includes the following elements:

means for receiving a cash transaction amount from the transaction terminal via the communication interface;

means for operating the display means to display the cash transaction amount;

means for operating the smart card interface means to read the current cash token value stored in a card inserted therein; and means responsive to the combination of receipt of a cash transaction amount and presence of a smart card in the smart card interface means for automatically and without other input from the buyer:

calculating a new cash token value as the difference between the current cash token value and the cash transaction amount;

operating the smart card interface means to write the new cash token value into the smart card; and sending a transaction message to the transaction terminal via the communication interface.

The advantages of this form of paystation apparatus are the same as the ones set forth above relative to the transaction method of this invention.

Other object, features and advantages of this invention will be apparent from a consideration of the following description and the appended claims in conjunction with the associated drawing figures.

DESCRIPTION OF PREFERRED EMBODIMENTS

Figure 1:
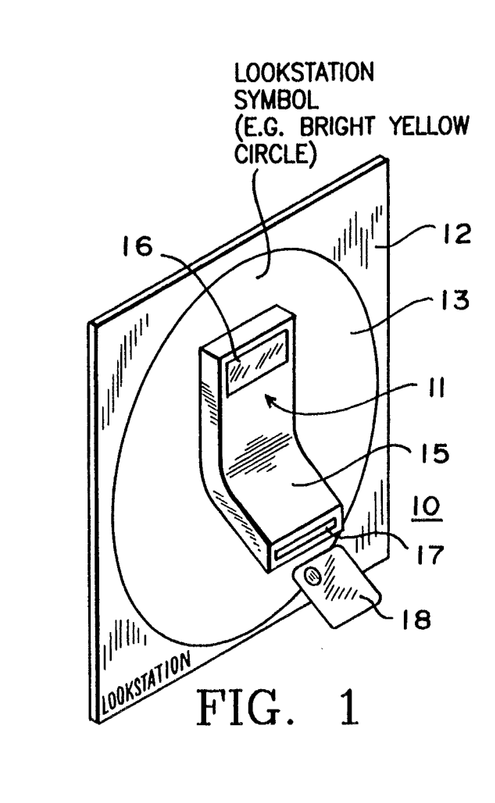
FIG. 1 is an isometric view of a Lookstation device in accordance with this invention.
Figures 5, 6, 7A, 7B, 7C, 8A, 8B, 8C:
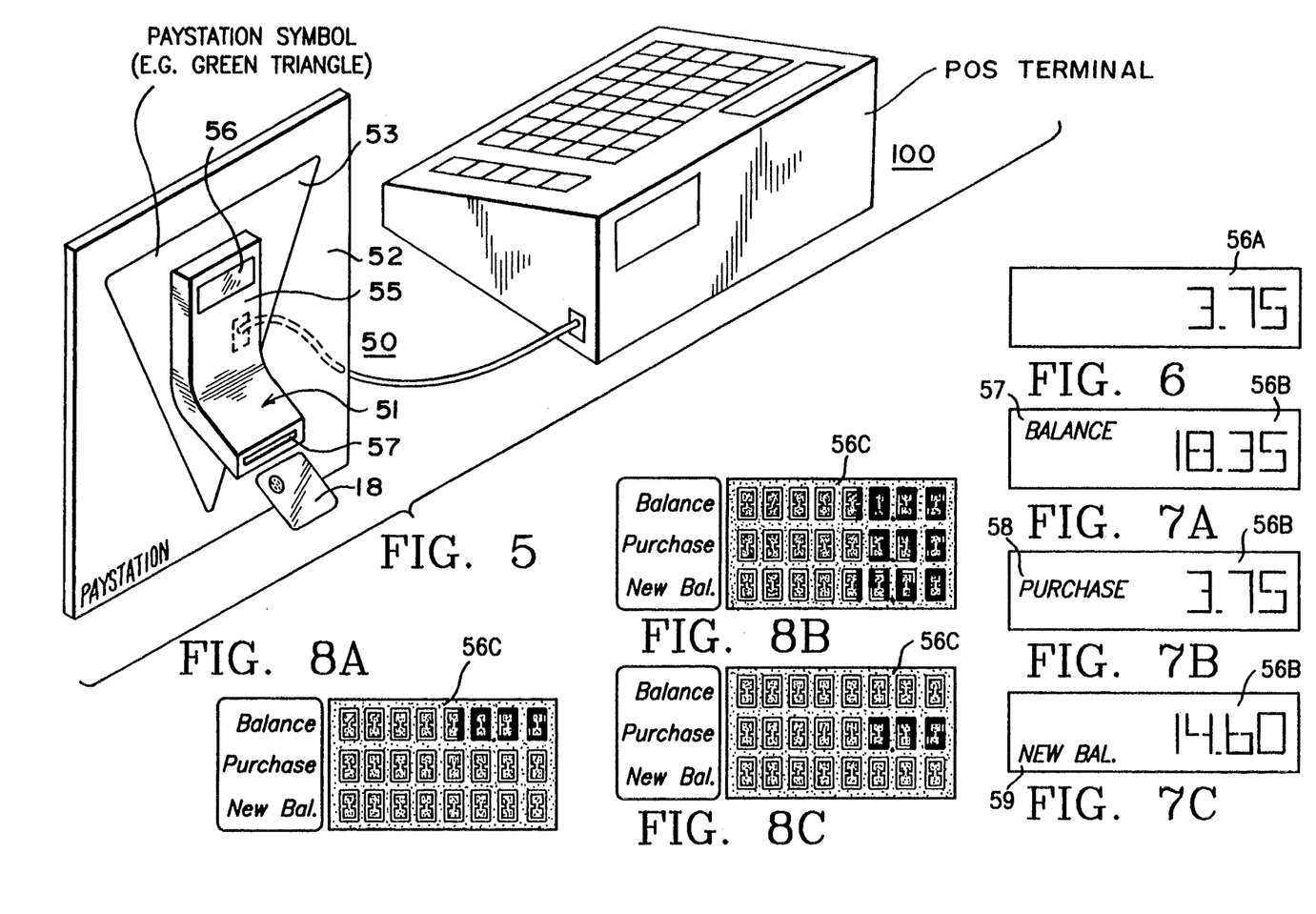
FIG. 5 is an isometric view of a Paystation device in accordance with this invention coupled to a transaction terminal.
FIGS. 6, 7A-7C, and 8A-8C illustrate alternative display arrangements for a Lookstation terminal in accordance with this invention.

Referring first to FIGS. 1 and 5, a description of the principles of the present invention will be given. FIG. 1 illustrates a "Lookstation" 10 and FIG. 5 illustrates a "Paystation" 50. The purpose of Lookstation 10 is to enable an Electronic Purse holder to look into the Electronic Purse and see the cash value stored therein. The purpose of Paystation 50 is to enable an Electronic Purse holder to pay for a purchase with the cash value stored in the Electronic Purse.

Lookstation 10 and Paystation 50 have associated symbologies that visually identify their functions. For example, Lookstation 10 has a terminal 11 mounted on wall 12 with a bright yellow circle 13 behind the terminal. Paystation 50 has terminal 51 similarly mounted on a bright green triangle 53. As the name implies, terminal 11 at Lookstation 10 functions to accept insertion of an Electronic Purse smart card to enable the holder of an Electronic Purse to see the current cash token value in the card displayed on terminal 11. Similarly, terminal 51 at Paystation 50 accepts insertion of an Electronic Purse to enable the holder to spend some of the current cash token value on the card. The colored symbologies enable persons to easily identify this functionality after minimal exposure.

Each of the terminals 11 and 51 of Lookstation 10 and Paystation 50 looks, and is, simple and easy to use. Terminal 11 comprises essentially a case 15, a card slot 17, and a display 16.

Paystation 50 has similar elements, a case 55, a display 56, and a card slot 57, although the display may be larger and show more parameters. There are no buttons to push or other complicating elements.

The simplicity of appearance and use of these units is predicated on the concept that the Electronic Purse will be a bearer instrument very much like paper money or coin. In other words, it will be assumed that the person carrying the Electronic Purse is in proper possession of it and has the right to use the current cash token value stored therein. Accordingly, there is no keypad to insert a PIN for verifying the identity of the holder and legitimating possession and use of the Electronic Purse.

Figures 2, 3A, 3B, 4:
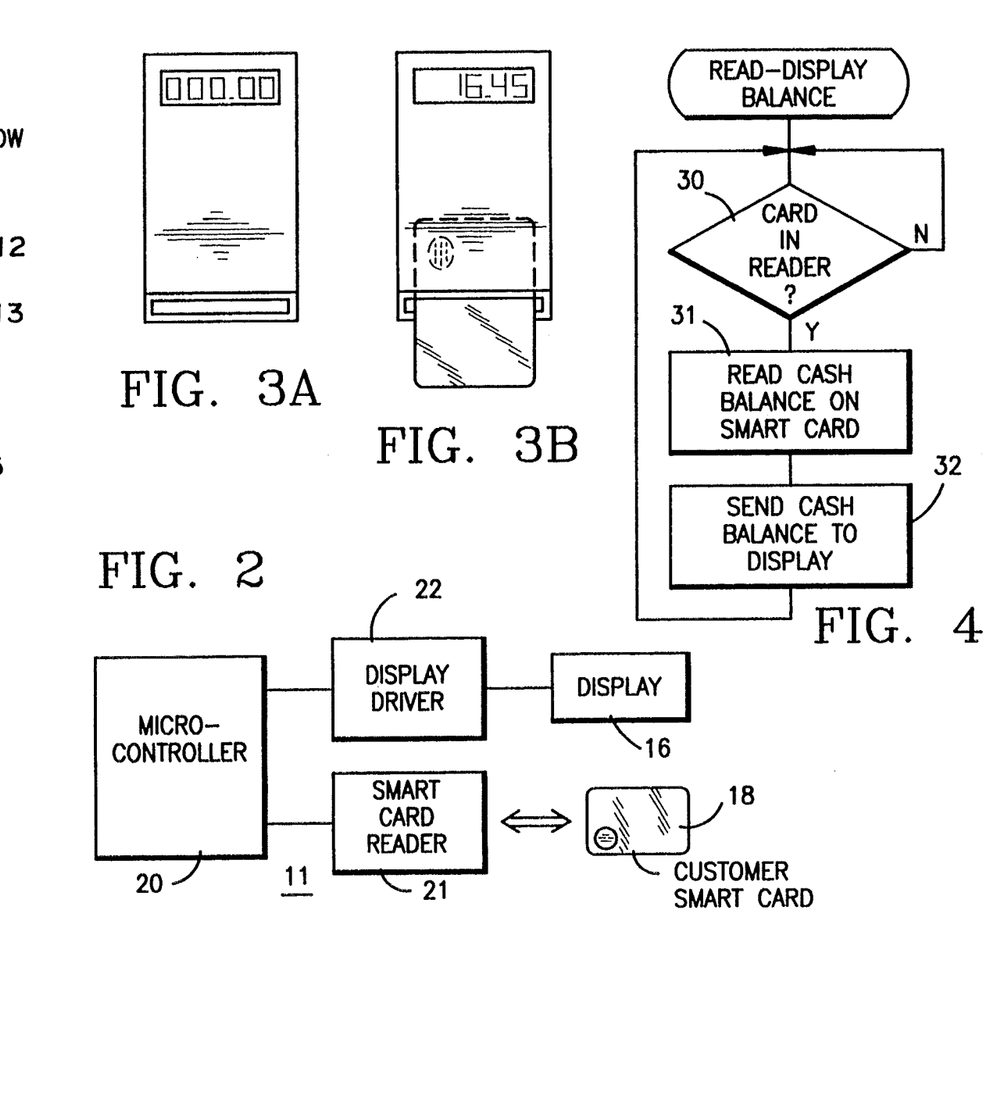
FIG. 2 is a block schematic diagram of a Lookstation terminal in accordance with this invention.
FIGS. 3A and 3B illustrate the use of a Lookstation terminal in accordance with this invention.
FIG. 4 is a flow chart illustrating operation of a Lookstation terminal in accordance with this invention.

Lookstation 10 enables the bearer to see how much electronic cash is stored on the Electronic Purse represented by card 18 by simply inserting card 18 in slot 17 and reading the balance displayed on display 16. FIG. 3A shows the terminal before the card is entered, with all "0" display elements (or equivalent to indicate that the unit is 'alive'). FIG. 3B shows the terminal with card inserted and balance of $16.45 displayed.

Paystation 50 enables the bearer of the Electronic Purse to spend some of the stored cash value by simply inserting card 18 in slot 57 of terminal 51. The act of inserting the card is itself the bearer's offer to use the stored cash value to pay for the transaction. As will be discussed in more detail below, the transaction terminal 100 will communicate the transaction amount to Paystation terminal 51 and ultimately receive back a message that the amount has been paid by withdrawal from the stored value on card 18. The cardholder's security in the transaction is based on the fact that only the terminal 51 has the ability to alter the stored cash value of the card 18. The transaction terminal 100 can only send to the Paystation terminal 51 a proposed transaction amount which will be displayed on display 56. Transaction terminal 100 has no direct control over the reading and writing of card 18 and thus no possibility of taking more value from the card than the transaction amount sent over the communication link.

There are various paradigms or protocols that can be employed in Paystation 50, but all essentially involve an offer to pay by insertion of card 18 and thus not requiring the pushing of buttons or other actions to tender payment. This makes the transaction very fast once the transaction total is available. If card 18 has already been inserted into card slot 57, security checks will have been run and cash balance already read from the smart card 18 and the other steps can be completed in less than a second. Even if the cardholder waits to put in the card until the purchase amount is displayed, the transaction steps will then be completed in a one or two seconds at most. This is much faster than any credit card or debit card transaction requiring on-line authorization from a host computer, and also faster and more convenient than a cash transaction using paper money and coin, especially if counting out of change is involved as is typical in completing a cash transaction.

In a business establishment, Lookstations will be placed at various convenient locations, near entrances for example, so that a potential customer can look up the cash value on the Electronic Purse before starting any shopping activity or before queuing up to order at a food counter or the like. This enables the bearer of an Electronic Purse to "open his wallet" to see if there is enough money to make contemplated purchases.

One the other hand, Paystations will be placed at transaction counters along with transaction terminals so that they can be deployed for accepting Electronic Purse payments.

Lookstation 10 - Structure and Function

Referring now to FIGS. 1–4, exemplary structural and functional elements of terminal 11 at Lookstation 10 will be discussed. The electronic elements of terminal 10 comprise a programmed microcontroller 20 interfaced to a smart card reader 21 and to a display 16 through display driver 22. Smart card reader 21 may be a simplified version of a smart card reader/writer module which would be required in read/write applications involving terminal and card security considerations. The background assurance given to the holder of the Electronic Purse is that the Lookstation terminal is only capable of reading and displaying the stored cash balance and specifically is not capable of altering any information stored in the Electronic Purse. Other than for this security of background assurances, there is no operational security requirement. The only operation desired is to read the stored cash token value and send it to display If card 18 has multiple token values, smart card reader 21 only has to be able to identify which token to read and pass the data to microcontroller 20.

The program running in microcontroller 20 may comprise the simple steps shown in FIG. 4. Step 30 involves checking whether a card is inserted in reader 21. Microcontroller 20 may be set up on an interrupt basis with smart card reader 21 sending an interrupt signal to microcontroller 20 when a card is inserted. If step 30 returns Yes, step 31 is executed to read the cash balance on the smart card 18. Smart card reader 21 will typically include intelligence for sending appropriate messages to smart card 18 to retrieve the stored cash token value and pass it to microcontroller 20 on a data bus. Following this, step 32 is executed to send the cash balance to display 16.

It will be apparent to persons skilled in the art that additional process steps could be included, such as checking to see if the card has been removed after the cash balance has been displayed for several seconds, sounding a buzzer or other audible alert if the card is left in longer than is reasonable, and erasing the display after the card is withdrawn. As is well known, other programs, such as diagnostic routines, may be included in microcontroller 20. Preferably, Lookstation terminal 11 is kept as simple as possible to enable low manufacturing cost and thus encourage placement of units at multiple locations for customer convenience.

Paystation 50 - Structure and Function

Referring first to FIGS. 5-8, some alternative embodiments of Paystation terminal 51 will be discussed. FIG. 6 shows a single line display 56A which may be used to display the transaction amount. One version of Paystation terminal utilizes such a single line display solely for displaying the transaction amount and a rigid transaction protocol sequence which requires the cardholder to wait for the transaction amount to be displayed before inserting card 18. Card insertion then signals agreement with the purchase amount and this amount is deducted from the stored cash token balance. Neither the initial cash token value nor the new cash token value are displayed under this protocol.

A variation on this rigid protocol would be to allow the cardholder to insert the card before the transaction amount is sent over from the transaction terminal and have the stored cash token value read and displayed. To keep the protocol rigid in use of card insertion as the act which is acceptance of the transaction amount, the cardholder must withdraw the card to permit the transaction amount to be received and displayed. Then the cardholder must re-insert the card to accept and compete the transaction.

It should be apparent that a less rigid protocol could be used, permitting the cardholder to leave card 18 in slot 57 to accept that the transaction will be completed with whatever transaction value is sent over from the terminal. Under this less rigid protocol, any dispute on the transaction amount would have to be settled with cash out of the till of the cash register.

FIGS. 7A-7C illustrates a transaction protocol which uses a single line display 56B with a time-shared display of transaction parameters, FIG. 7A shows a display of card balance before the transaction and lighting of "Balance" display field 57. FIG. 7B shows a display of the purchase amount and lighting of associated "Purchase" field. FIG. 7C shows a display of the new card balance and "New Bal" field after the transaction is completed. Any of the above protocols could use this time-shared display.

FIGS. 8A to 8C show the use of a three line display 56C so that the three transaction parameters can be displayed concurrently, making it easy for the cardholder to do the simple arithmetic to verify that the new balance on the card correctly reflects subtracting the purchase amount from the prior card balance.

Figure 9:
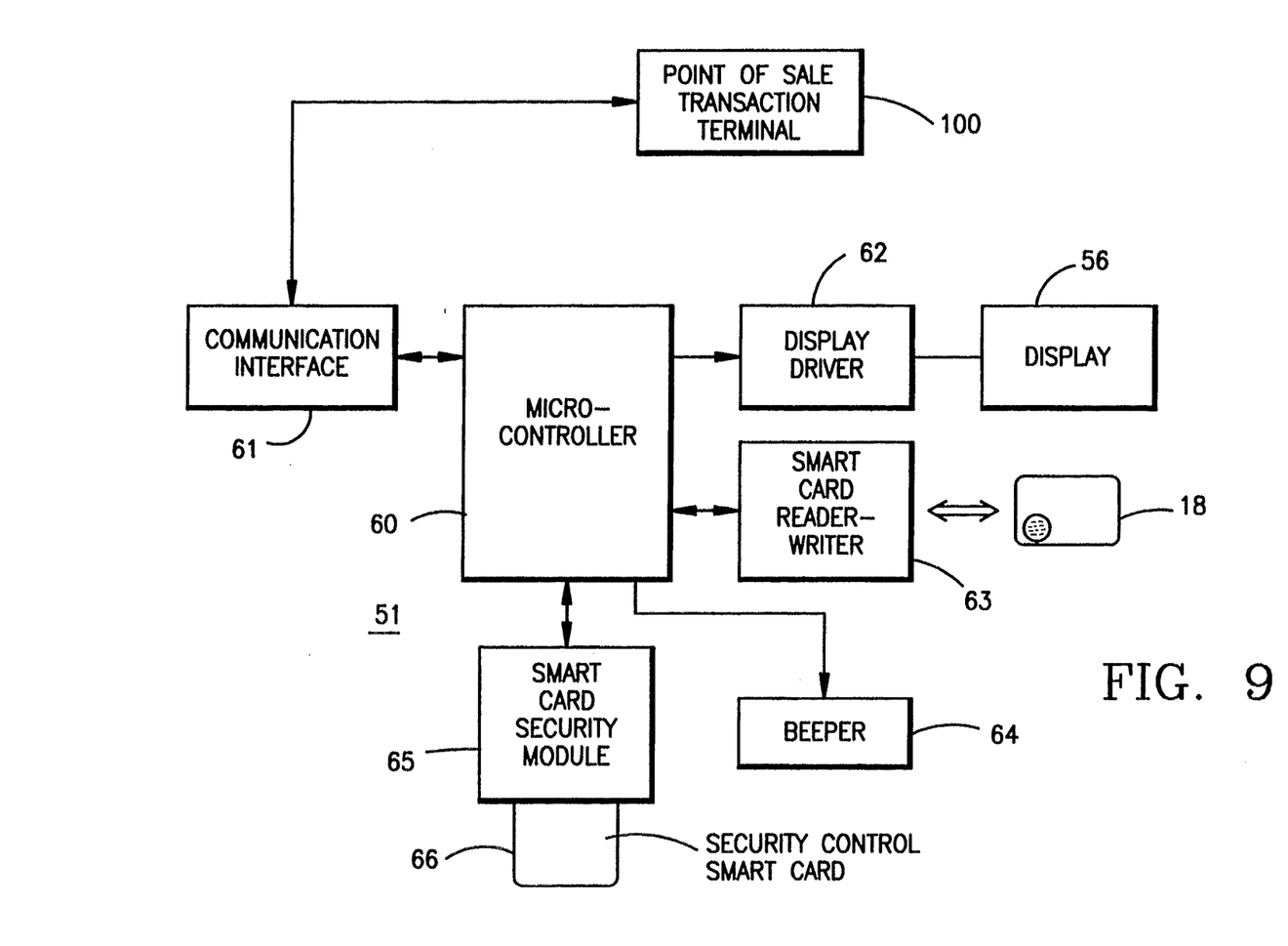
FIG. 9 is a block schematic diagram of a Paystation terminal in accordance with this invention coupled to a transaction terminal.

FIG. 9 is a block diagram of system components of Paystation terminal 51. Microcontroller 60 communicates with point-of-sale terminal 100 via communication interface 61 which may be any standard communication interface such as an RS232 serial data link. A display driver 62 provides microcontroller 60 with an interface to display 56. A smart card reader-writer unit 63 provides the data reading and writing operations on card 18 and functions together with security module 65 and security control card 66 to enable card 18 and terminal 51 to authenticate each other as a prerequisite of completing a transaction. These units and the security protocols are well known in the smart card industry and need not be described in detail here. Beeper 64 is provided to enable microcontroller 60 to give audible signals to the card holder.

Figures 10, 10A:
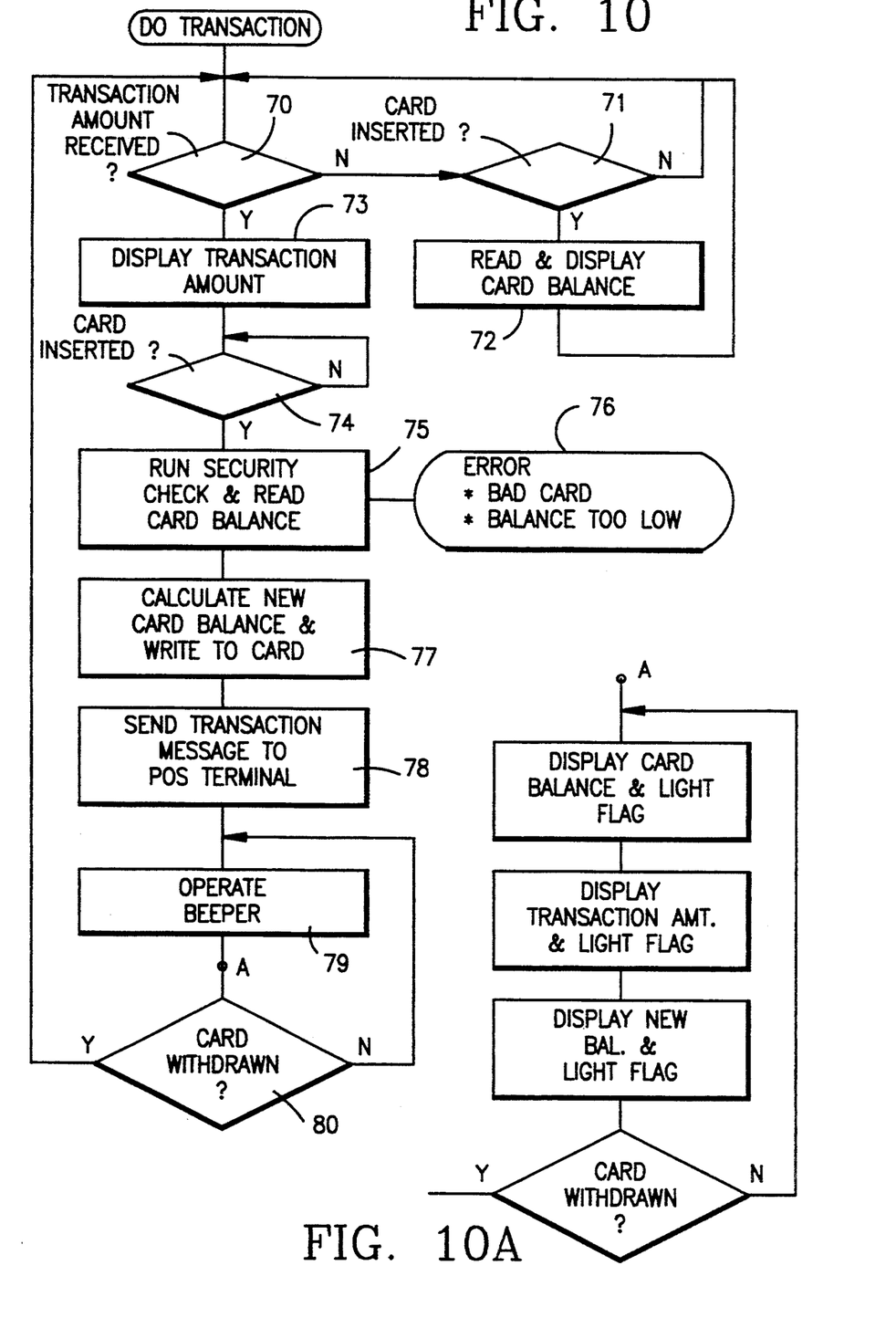
FIG. 10 is a flow chart illustrating operation of one embodiment of a Paystation terminal in accordance with this invention.
FIG. 10A is a partial flow chart illustrating an alternative operation of a Paystation terminal embodiment in accordance with this invention.

FIG. 10 illustrates steps of a "Do Transaction" program which may be utilized in the system of FIG. 9 with a single line display. Steps 70 and 71 sequentially check whether a transaction amount has been received and whether a card has been inserted. If both steps return NO, the program returns to start over and the steps are executed again. In a typical hardware-software environment, these checking steps are actually represented by interrupts received from peripherals or interface units when some condition has changed, such as card insertion or data being received. If the cardholder inserts his card before the transaction amount is communicated, step 70 will return NO, but step 71 will return Yes, and step 72 will then be executed to read and display the card balance, i.e. the current cash token value stored on card 18. Then the program will return to wait for the transaction amount.

If a rigid protocol as described above is used, the process would be altered so that the transaction amount is not received and displayed unless there is no card inserted in the terminal.

When the transaction amount has been received, step 70 returns YES and then step 73 is executed to display the transaction amount. Checking step 74 verifies whether the card has been inserted and loops until a card insertion is detected. Once the card has been inserted, step 75 is executed to run a security or authentication check on the card and then to read the card balance. The authentication between card and terminal may be mutual, i.e. the card may authenticate the terminal and vice versa. At this point, an error may be declared if the terminal does not authenticate the card or if the card balance is too low to complete the transaction. A distinctive error signal via beeper 64 may be sounded at this point. The clerk will then be able to explain why the transaction will not go through.

Assuming step 75 results in no errors being declared, step 77 is executed to calculate a new card balance and write that new balance to card 18. Step 78 then executes to send a transaction message to the terminal 100. The content of this message depends on the established transaction protocol which is not relevant to this invention. Step 79 is then executed to operate the beeper to signal the cardholder that the transaction has been completed and the card can be withdrawn. Step 80 checks for card withdrawal and either returns to the start of the program if Yes is returned, or operates the beeper again if the card is left in too long.

FIG. 10A illustrates a modification of FIG. 10, starting at point A, in which sequential displays of the transaction parameters are provided after the transaction is completed so the cardholder can verify all the amounts and the correctness of the transaction. These steps relate to the single line display of FIGS. 7A-7C.

Figure 11:
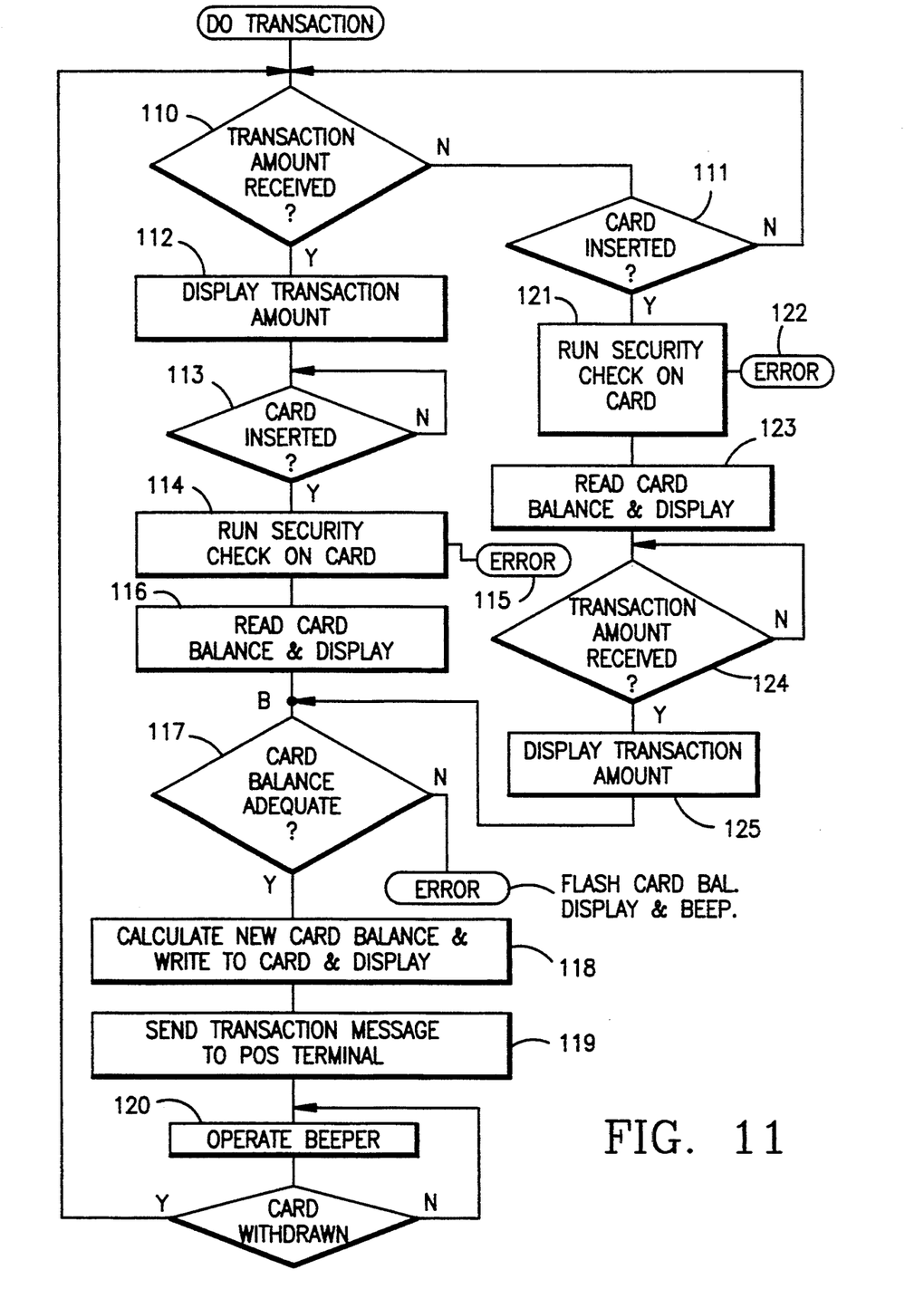
FIG. 11 is a flow chart illustrating operation of another embodiment of a Paystation terminal in accordance with this invention.

FIG. 11 illustrates an alternative DO TRANSACTION program associated with a multiline display of FIGS. 8A-8C. Basically, two different program paths are illustrated with the path taken depending on which condition is satisfied first, the condition of testing step 110 for receipt of the transaction amount or step 111 for insertion of the card. These two pathways may represent two separate interrupt process modules which execute in an order depending on which interrupt occurs first.

If the transaction amount is received first so that step 110 returns YES, then step 112 executes to display the transaction amount on the center line of display 56C as shown in FIG. 8C and then the program loops until a card is inserted. Card security check 114 and card balance read and display 116 are then executed.

If the card insertion occurs first, step 121 and following steps are executed to run card and terminal security checks (step 121), read and display the card balance (step 123) and then loop until the transaction amount is received (step 124), followed by display of transaction amount (step 125).

Both of these execution paths merge at point B and this is followed by execution of a checking step on adequacy of the card balance to cover the transaction amount. If this returns NO, an error is declared (the beeper is operated with distictive error signal, and the card balance display may be flashed to show the cardholder what is the transaction error).

If the card balance is adequate, step 118 executes to calculate a new card balance, and write it to card 18 as well as display it on line 3 of the display. This is followed by sending a transaction message in step 119 and then operating the beeper to signal transaction complete in step 120. The program will then loop until the card is withdrawn and return to the beginning after card withdrawal.

It should be apparent that the above descriptions of various embodiments of the method and apparatus of this invention are given by way of example only and that numerous modifications could be made without departing from the principles of the invention as set forth in the following claims.

What is claimed is:

1. A method of carrying out a transaction between a buyer and a seller using a smart card having a cash token stored therein with a current cash token value, the steps of:

disposing on the seller's premises at a location separated from a transaction station a lookstation device having a distinctive Lookstation Symbol associated therewith, said lookstation device being adapted for insertion by a buyer of a smart card followed by automatic read and display to the buyer of the current cash token value stored therein to inform the buyer of his cash purchasing power;

disposing on the seller's premises at said transaction station a paystation device having a distinctive Paystation Symbol associated therewith and being coupled to a transaction terminal for participating in carrying out a transaction by means of the steps of:

a. the transaction terminal communicating to said paystation device a cash transaction amount;

b. the paystation device displaying said cash transaction amount;

c. the buyer inserting into said paystation device a smart card having a cash token stored therein to indicate acceptance of said cash transaction;

d. the paystation device reading the current cash token value in said inserted smart card;

e. the paystation device calculating a new cash token value as the difference between said current cash token value and said cash transaction amount;

f. the paystation device automatically writing said new cash token value into said cash token of said smart card without further action by the buyer; and g. the paystation device communicating a cash transaction completion message to said transaction terminal.

2. The method of claim 1, wherein said step c. may be carried out before or after steps a. and b. and further comprising the step of:

d.1. the paystation device displaying said current cash token value if said step c. carried out before steps a. and b.

3. The method of claim 1, further comprising the step h. the paystation device displaying in sequence on a single line display said current cash token value, said cash transaction amount, and said new cash token value.

4. The method of claim 1, wherein said step b. is carried out by displaying said cash transaction amount on a display line dedicated to the cash transaction amount parameter and appropriately labeled to inform the buyer; and further comprising the steps of:

d.1. the paystation device displaying said current cash token value on a display line dedicated to the current cash token value parameter and appropriately labeled to inform the buyer; and e.1. the paystation device displaying said new cash token value on a display line dedicated to the new cash token value parameter and appropriately labeled to inform the buyer.

5. The method of claim 1, further comprising the steps of:

d.1. the paystation device comparing said current cash token value with said cash transaction amount and declaring a transaction error if said cash transaction amount is greater than said current cash token value.

6. A method of carrying out a transaction between a buyer and a seller using a smart card having a cash token stored therein with a current cash token value and utilizing a paystation device coupled to a transaction terminal comprising the steps of:

a. the transaction terminal communicating to said paystation device a cash transaction amount;

b. the paystation device displaying said cash transaction amount;

c. the paystation device reading the current cash token value stored in a smart card inserted by the buyer to signify an offer to pay the cash transaction amount using said cash token stored in said smart card;

d. the paystation device calculating a new cash token value as the difference between said current cash token value and said cash transaction amount;

e. the paystation device automatically writing said new cash token value into said cash token of said smart card without further action by the buyer; and f. the paystation device automatically communicating a cash transaction message to said transaction terminal.

7. The method of claim 6, further comprising the step of:

d.1. the paystation comparing said current cash token value with said cash transaction amount and declaring a transaction error if said cash transaction amount is greater than said current cash token value.

8. The method of claim 7, wherein said step b. is carried out by displaying said cash transaction amount on a display line dedicated to the cash transaction amount parameter and appropriately labeled to inform the buyer; and further comprising the steps of:

c.1. the paystation device displaying said current cash token value on a display line dedicated to the current cash token value parameter and appropriately labeled to inform the buyer7 and d.2. the paystation device displaying said new cash token value on a display line dedicated to the new cash token value parameter and appropriately labeled to inform the buyer if the comparison in step d.1. indicates that the transaction can be completed, and alternatively, d.3. the paystation device blinking the display of current cash token value and sounding an error indication to inform the buyer if the comparison in step d.1. indicates that the transaction can not be completed.

9. A paystation device adapted to be coupled to a transaction terminal for carrying out a transaction between a seller and a buyer using a smart card having a cash token value stored therein and having a current cash token value and comprising:

smart card interface means for accepting insertion of a smart card, for reading a current cash token value stored therein, and for writing a new cash token value thereto;

a display means for displaying cash amounts;

a communication interface for communicating data messages between said paystation device and said transaction terminal;

programmed control means coupled to said smart card interface means, said display means, and said communication interface and comprising:

means for receiving a cash transaction amount from said transaction terminal via said communication interface;

means for operating said display means to display said cash transaction amount;

means for operating said smart card interface means to read the current cash token value stored in a card inserted therein; and means responsive to the combination of receipt of a cash transaction amount and presence of a smart card in said smart card interface means for automatically and without other input from the buyer:

calculating a new cash token value as the difference between said current cash token value and said cash transaction amount;

operating said smart card interface means to write said new cash token value into said smart card; and sending a transaction message to said transaction terminal via said communication interface.

10. Apparatus as claimed in claim 9, wherein said display means comprises a three line display;

said means for operating said displaying means displays said cash transaction amount on the middle line of said three line display, said current cash token value on the top line of said three line display, and said new cash token value on the bottom line of said three line display.

* * * * *